United States Patent Office 3,098,052
Patented July 16, 1963

3,098,052
THIXOTROPIC COATING SOLUTIONS
John V. Schmitz, Louisville, Ky., and Roswell J. Blackinton, Schenectady, N.Y., assignors, by mesne assignments, to California Research Corporation, San Francisco, Calif., a corporation of Delaware
No Drawing. Filed Dec. 12, 1957, Ser. No. 702,240
6 Claims. (Cl. 260—22)

This invention relates to thixotropic coating solutions, and to a method for their preparation, and more specifically to thixotropic coating solutions prepared by co-reacting oil-modified polyester resins with certain crosslinking agents in the presence of a minimum and critical concentration of solvent.

The surface coating industry has recently become aware of the importance of thixotropy to resinous coating solutions. This property of thixotropy in resinous coating solutions has in the past been achieved by the incorporation of inorganic fillers, such as silica; by the reaction of, for example, certain polyamides with alkyd resins or by other methods. However, each of these methods produces thixotropic compositions having certain inherent drawbacks. It is highly desirable to obtain a resinous coating solution which is thixotropic as formed without the addition of filler materials. The polyamide type thixotropic compositions possess the disadvantage of having a viscosity which is very sensitive to temperature. As a result they are difficult to handle easily at normal temperatures. High temperatures have been necessary to reduce their viscosity to a point where they may be conveniently pumped or poured.

Alkyd resins are widely used in the paint and surface coating industry. These resins are generally prepared by bulk polymerization in the absence of a solvent. In those cases where a solvent has been utilized, the solvent has been used simply as an azeotrope to carry off the water of esterification. Recently, solvent polymerization has also been suggested for the graft copolymerization of alkyd resins with vinyl monomers such as styrene, because of the necessity to prevent gelling and self-polymerization of the vinyl monomers with each other. These processes are not brought to the incipient gel stage because the resulting resins would be unstable.

It is an object of this invention to provide a thixotropic resinous coating solution in which the thixotropy is built into the resin molecule, and which in addition is bound by primary rather than secondary valence bonds. It is an additional object of this invention to provide a thixotropic resin solution having wide versatility in application, which is easily handled at normal temperatures and which imparts superior weather-resistance and other properties to pigmented and other coating compositions. It is also an object of this invention to provide a novel process for the polymerization of alkyd resins, which process results in a thixotropic composition.

We have discovered that thixotropic coating solutions may be produced by coreacting, in the presence of an inert organic solvent, an oil-modified polyester resin and a cross-linking agent selected from the group consisting of (1) polyepoxides and (2) polyepoxides and difunctional organic acid anhydrides, to the incipient gel stage of the resin. The process is carried out under conditions such that the concentration of the organic solvent is no less than 15 percent at the conclusion of the reaction.

Thixotropy may be defined as the property or phenomenon exhibited by certain suspensions or gels which possess a structure that is destroyed by agitation and rebuilt upon rest. A thixotropic solution possesses high viscosity at low stress, and low viscosity at high stress. Thus, a thixotropic system has less apparent viscosity while being agitated rapidly than it has while being agitated slowly or while at rest. In a paint, thixotropy is a desirable property. A thixotropic paint is viscous in the paint can as received and shows a reduced tendency to spill or drip from a paint brush. It is less viscous and more fluid under agitation while being brushed, rolled or sprayed, and thus provides easier brushing. It will return to a more viscous state after application to a surface and does not tend to flow or sag.

Because of the structural nature of the resinous polymers of this invention, our thixotropic solutions possess a number of advantages. Their viscosity changes gradually over a sufficiently wide range of temperatures so that they can be poured or pumped at normal temperatures and do not require elevated temperatures for handling. The necessity for scooping or scraping the resins or preheating them during their handling is eliminated. They possess better brushability, improved air-dry time and superior weather resistance to known thixotropic coating solutions.

A critical feature of the present invention resides in the discovery that a thixotropic resin can be made if the final polymerization takes place in solution. It is possible to utilize solution polymerization for the entire polymerization reaction, or to prepare the oil-modified alkyd resin in bulk fashion in accordance with usual esterification techniques and then to carry out the copolymerization reaction with the crosslinking agent in solution. The solvent concentration must be maintained because the final solvent concentration at the termination of the reaction must, in any case, be no less than 15 percent, by weight, based upon the weight of reactants and solvent. Preferably, the solvent concentration is maintained so that the final solvent concentration is in excess of 30 percent and even more preferably between about 40 and 70 percent. The polymerization reaction of our invention will proceed at temperatures below the usual esterification reaction temperatures. Thus, the reaction temperatures may be below the boiling point of the solvents, thus avoiding the necessity of pressure vessels. However, the same result may also be achieved if the boiling points are exceeded through the use of pressure vessels or reflux condensers, although the use of these latter expedients are not preferred. Because the organic solvents will ordinarily have boiling points less than about 180° C., the copolymerization temperature will generally be below this temperature. As a practical matter, it has been found that the most desirable temperature range lies between about 80 and 180° C.

Optimum thixotropy is obtained only if the copolymerization reaction is carried out to the incipient gel stage. The incipient gel stage may conveniently be determined by a tail or tip on a viscosity bubble in a Gardner-Holdt viscosity tube. This condition of a resin has hitherto been known to those skilled in the art to indicate viscosity instability and has therefore been avoided. Viscosity instability, as commonly known in the resin coating industry, is that point at which a liquid upon standing becomes a solid or changes to an infinite viscosity. Our resins, because of their method of preparation, can remain in the incipent gel stage for prolonged periods without so changing to a solid, useless material. In the present invention, incipient gel stage defines the relatively narrow range between onset of thixotropy and excessive gel formation. Its viscosity range varies with the particular resin formulation, but can be duplicated quite closely in successive polymerization reactions within the scope of our invention.

A wide variety of alkyd resins may be employed as starting materials in the practice of the present invention. The particular starting materials used will depend upon the final properties desired, such as compatibility with solvents or other film formers, air-drying properties, film hardness or flexibility. The viscosity of the starting alkyd resin will, of course, be lower than the final viscosity of the thixotropic alkyd resin solution. Any of the known raw materials for alkyd resins may be used to prepare alkyd resins suitable for the copolymerization reaction of the present invention. As is well known, these resins are produced by the reaction of a polyfunctional acid or anhydride, a polyfunctional alcohol and a saturated or unsaturated oil. Typical polyfunctional acids or anhydrides are phthalic, isophthalic, terephthalic, malonic, succinic, adipic, sebacic, azelaic, and the like, or unsaturated acids or anhydrides such as maleic, fumaric, itaconic, and aconitic. Mixtures of the foregoing saturated and unsaturated acids and substances such as rosin, containing chiefly abietic acid, may also be used. The polyfunctional alcohol may be, for example, ethylene glycol, diethylene glycol, propylene glycol, sorbitol, pentaerythritol, glycerine, hexaethylene glycol and other polyhydric alcohols well known to the art. Suitable examples of oils are soya oil, safflower oil, tall oil, castor oil, linseed oil, cotton-seed oil, corn oil, chinawood oil, coconut oil and many others also well known to the alkyd resin industry. Generally, the acid number of the starting alkyd should be below about 100 for proper stability of the final product, and in the usual case should be below 50 and preferably below 25.

The copolymerization reaction of the present invention is carried out in the pressence of a polyepoxide cross-linking agent, either with or without additional difunctional organic acid anhydride. An advantage of the present invention results from the rapid reaction, in solution, of polyepoxides with alkyd-pendant carboxylic acid groups. If the starting alkyd is of sufficiently low acidity, having an acid number for example below about five or ten, alkyd-pendant carboxylic acid may be introduced into the alkyd resin through reaction of a dibasic acid anhydride, in solution, with free alkyd hydroxyl groups. It has been found necessary for controlled coreaction to use anhydrides rather than acids. The anhydrides are more reactive than acids and thus will react at the lower temperatures used.

The polyepoxide crosslinking agent may be any compound containing at least two, and preferably three or even more, epoxy groups per molecule. The higher functionality of the epoxy groups has been found desirable because much of the acidity in alkyds is present in low molecular weight fractions, which will tie up the epoxy group without contributing to crosslinking. The epoxide compounds may be epoxidized unsaturated oils such as epoxidized soya oil, epoxidized linseed oil, epoxidized safflower oil, etc.; epoxidized polyfunctional olefins, such as diepoxy biallyl, diepoxy butadiene, epoxidized polybutadiene and epoxidized polyisoprene; esters of a polyhydric alcohol, such as ethylene glycol, glycerol, pentaerythritol or trimethylolethane, and an epoxy derivative of an unsaturated acid (such as oleic, linoleic or linolenic). In addition, epoxy resins comprising a polyether derivative of a polyhydric organic compound containing epoxy groups may also be used in the practice of this invention. These epoxy resins are generally reaction products of a dihydric phenol and an epihalogenohydrin and are described, for example, in U.S. Patents 2,494,295, 2,500,600 and 2,511,913. Many of the latter resins are sold under the trade names Epon and Araldite resins.

The relative proportion of alkyd resin and crosslinking agent will vary with the molecular weight of the starting alkyd resin and with the number of epoxy groups per molecule in the polyepoxide. Thus diepoxide will require proportionately more epoxide compound than an epoxide of 3 or higher functionality. A low molecular weight alkyd will require more epoxide crosslinking agent than a higher molecular weight alkyd. Generally, the amount of polyepoxide compound will not exceed about 20% by weight, based upon total weight of the alkyd and epoxide reactants, and preferably will not exceed about 10%. The amount of additional difunctional acid anhydride, where used, will ordinarily be on the order of 10% or preferably 5% or less, based upon total weight of the reactants. The chief limiting factor, insofar as amounts of reactants are concerned, is the desirability in the crosslinking reaction for the presence of a stoichiometric excess of acid groups in relation to epoxy groups.

Any organic solvent may be used, it being only necessary that it be, in fact, a solvent for the reactants and inert to both the reactants and the reaction conditions. In addition, it is preferable that the solvent be relatively high boiling. Thus, the solvents may be of the paraffinic hydrocarbon type, for example, those conforming to the formula $C_nH_{2n+2}$, where $n$ lies between 6 and 16; aromatics such as toluene, xylene, naphthalene, terpenes and their homologues; chlorinated aliphatics such as carbon tetrachloride and ethylene dichloride; alkyl ethers such as dibutyl ether or ketones such as methyl isobutyl ketone; esters such as ethyl benzoate, amyl acetate, glycol diacetate; and nitrogen containing organic solvents such as nitrobenzene and nitroethane. Mineral spirits comprising a mixture of aliphatic, naphthenic and aromatic hydrocarbons are particularly suitable.

The following examples are given by way of illustration and not by way of limitation. All parts, unless otherwise identified, are by weight.

*Example 1*

An alkyd resin was first prepared from the following reactants.

| Part I: | Parts |
|---|---|
| Soya fatty acids | 43.0 |
| Pentaerythritol | 16.9 |
| Glycerine | 2.3 |
| Phthalic anhydride | 23.7 |
| Solvesso 100 (a high boiling point aromatic hydrocarbon solvent) | 4.0 |
| Part II: Bodied safflower oil | 19.4 |

The part I reactants were heated to 200° C. with agitation until the reaction mixture formed a clear pill. The bodied safflower oil was then added and the reactants refluxed at 230°–235° C. to a viscosity of Y–Z1 (Gardner-Holdt scale) in 50% (±1%) odorless mineral spirits. The resin had an acid number of 17–20.

*Example 2*

To 95.7 parts of the 50% alkyd resin solution of Example 1 was added 1.5 parts of epoxidized soya oil 1.5 parts of odorless mineral spirits and a lithium ricinoleate catalyst (which may be omitted). The epoxidized soya oil had the following analysis:

| | |
|---|---|
| Epoxide double bonds _____percent__ | 80.4 |
| Free fatty acid _____do____ | 0.3 |
| Acid number _____do____ | 6.0 |
| Saponification number _____ | 177.0 |
| Iodine value _____ | 5.5 |
| Oxirane groups _____percent__ | 6.1 |
| Calculated oxirane/oil molecule _____ | 3.6 |
| Molecular weight _____ | 939.0 |

The above solution was agitated and heated for one hour at 175–180° C. until no further change in viscosity resulted. Heating was then continued at the same temperature while 0.65 additional part of the epoxidized soya oil in 0.65 part of additional mineral spirits were added. Heating was continued until a tip appeared on a viscosity bubble in a Gardner-Holdt viscosity tube. The final solvent concentration was about 50%. The viscosity was W–Y on the Gardner-Holdt scale when diluted to 30% solids concentration.

The resin was used to prepare an easy-brushing and non-sagging flat architectural enamel with excellent hold-out (i.e. non-penetrating) on porous surfaces. A blend of this resin with a conventional long oil alkyd resin was used to prepare easy-brushing and non-sagging semi-gloss and gloss architectural enamels.

Example 3

An alkyd resin was prepared from the following reactants.

Part I:                                                  Parts
    Rosin _____ 33.6
    Tall oil fatty acid _____ 48.5
    Pentaerythritol _____ 12.7
Part II:
    Maleic anhydride _____ 10.8
    Solvesso 100 _____ 4.0

Part I was heated with agitation for one hour at 200° C. until a clear pill was formed. Part II was added and refluxed at 230–235° C. to a viscosity of Z–4 to Z–5 (Gardner-Holdt) at 60% (±1%) solids in odorless mineral spirits. The acid number of the resin was 43.

Example 4

To 89 parts of the 60% alkyd resin solution of Example 3 was added 1.6 parts of epoxidized soya oil, 1.6 parts of phthalic anhydride, and 3.3 parts of odorless mineral spirits. The reactants were heated with agitation at 170° C. for approximately one hour after which 2.7 parts additional epoxidized soya oil and 2.7 parts additional odorless mineral spirits were added. Heating was continued until a tip on a viscosity bubble in a Gardner-Holdt viscosity tube was formed. The viscosity was Z–4 (Gardner-Holdt) in 35% solids solution.

Example 5

An alkyd was prepared in much the same manner as the above Examples 1 and 3 from soya fatty acids, glycerine, pentaerythritol, phthalic anhydride and a small amount of a high boiling aromatic solvent. Its viscosity at 50% solids was V+ on the Gardner-Holdt scale and it had an acid number of 5.6.

To 86.5 parts of the above alkyd in a 40% solids solution of odorless mineral spirits was added 7.7 parts of epoxidized soya oil and 5.8 parts phthalic anhydride. The mixture was heated at 180° C. for five hours until a tip appeared on a viscosity bubble as in Example 4 above. The thixotropic solution had a viscosity of Z–2 (Gardner-Holdt) at 30% solids concentration.

The thixotropic resin solutions of the present invention can be used either alone or in combination with other oil-modified alkyd resins. Their versatility is demonstrated by their wide compatibility with other coating resins and by the wide spectrum of properties, such as viscosity, air-drying properties, film hardness and baking properties, which may be achieved by suitable choice of reactants and reaction conditions. They possess the ability to be sprayed and can thus be used to produce mottled or hammer-tone finishes. They may also be used for surface coating where non-penetration is desired as for porous substrates such as fiber-board. They may be used in the manufacture of low cost interior architectural enamels, in air-drying industrial enamels and in other applications well known in the surface coating industries.

What we claim as new and desire to secure by Letters Patent of the United States is:

1. Process for the production of thixotropic coating solutions which comprises coreacting the following components at a temperature in about the range 80° C.–180° C. in the presence of an inert organic solvent to the incipient gel stage: (1) an oil-modified polyester resin of a polyfunctional alcohol and acid material selected from the group consisting of polyfunctional carboxylic acids and their anhydrides, said resin having an acid number below 100; and (2) a cross-linking epoxidized unsaturated glyceride oil having at least two epoxy groups per molecule in an amount up to 20 percent by weight based on combined weight of the polyester resin and epoxidized oil; the concentration of said solvent being no less than 15 percent, by weight, based on the reactants and solvent, at the conclusion of the reaction.

2. Process according to claim 1, wherein the polyester has an acid number less than 50, the concentration of the solvent at the conclusion of the reaction being no less than 30 percent.

3. The product of the process of claim 2.

4. The process of claim 2, in which the polyepoxide is used with up to 10 percent by weight based on total reactants of a difunctional organic acid anhydride to provide a stoichiometric excess of acid groups in relation to epoxy groups.

5. Process according to claim 2, wherein the cross-linking epoxidized unsaturated glyceride oil is soya oil.

6. The product of the process of claim 5.

References Cited in the file of this patent
UNITED STATES PATENTS

| | | |
|---|---|---|
| 2,556,145 | Neiderhauser | June 5, 1951 |
| 2,634,245 | Arndt | Apr. 7, 1953 |
| 2,691,004 | Doyle | Oct. 5, 1954 |
| 2,712,535 | Fisch | July 5, 1955 |
| 2,887,459 | Carmody | May 19, 1959 |
| 2,907,723 | Greenlee | Oct. 6, 1959 |
| 2,959,559 | Delius | Nov. 8, 1960 |

FOREIGN PATENTS

| | | |
|---|---|---|
| 762,881 | Great Britain | Dec. 5, 1956 |